(12) United States Patent
Devegowda et al.

(10) Patent No.: US 8,412,751 B2
(45) Date of Patent: Apr. 2, 2013

(54) DETERMINING WHETHER A JAVA OBJECT HAS BEEN SCAN-MISSED BY A GARBAGE COLLECTOR SCAN

(75) Inventors: Amar Devegowda, Bangalore (IN); Charles R. Gracie, Kanata (CA); Venkataraghavan Lakshminarayanachar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 12/969,150

(22) Filed: Dec. 15, 2010

(65) Prior Publication Data
US 2012/0158801 A1 Jun. 21, 2012

(51) Int. Cl.
G06F 12/00 (2006.01)
G06F 17/30 (2006.01)
(52) U.S. Cl. .................................................. 707/813
(58) Field of Classification Search .................. None
See application file for complete search history.

(56) References Cited

U.S. PATENT DOCUMENTS

| | | | |
|---|---|---|---|
| 5,088,036 A * | 2/1992 | Ellis et al. ............................ | 1/1 |
| 5,485,613 A * | 1/1996 | Engelstad et al. .................... | 1/1 |
| 5,857,210 A * | 1/1999 | Tremblay et al. ..................... | 1/1 |
| 6,327,701 B2 | 12/2001 | Ungar | |
| 6,546,546 B1 | 4/2003 | Van Doorn | |
| 6,671,707 B1 * | 12/2003 | Hudson et al. ........................ | 1/1 |
| 2002/0099765 A1 * | 7/2002 | Otis ............................. | 709/203 |
| 2003/0200392 A1 * | 10/2003 | Wright et al. ................ | 711/118 |
| 2007/0022149 A1 * | 1/2007 | Bacon et al. .................. | 707/206 |
| 2008/0040407 A1 | 2/2008 | Ge et al. | |
| 2008/0163009 A1 | 7/2008 | Wintergerst et al. | |
| 2008/0172538 A1 | 7/2008 | Dice et al. | |
| 2010/0114998 A1 * | 5/2010 | Steensgaard et al. ......... | 707/813 |

FOREIGN PATENT DOCUMENTS

JP 2009238011 A 10/2009

OTHER PUBLICATIONS

Lorenz Huelsbergen et al., A Concurrent Copying Garbage Collector for Languages that Distinguish (Im)mutable Data, 1993, ACM, pp. 73-82.*
A. Messer et al., "Susceptibility of Commodity Systems and Software to Memory Soft Errors" IEEE Transactions on Computers, vol. 53, No. 12, Dec. 2004, pp. 1557-1568.
S. Jiang et al., "A Debugging Approach for Java Runtime Exceptions Based on Program Slicing and Stack Traces" 2010 10th International Conference on Quality Software, pp. 393-398.
S. Klose et al., "Implementation of Generational Garbage Collector in SOM++VM" pp. 1-11, http://www.manuel-blechschmidt.de/data/Generational_GQ.pdf.

* cited by examiner

*Primary Examiner* — Pierre Vital
*Assistant Examiner* — Taelor Kim
(74) *Attorney, Agent, or Firm* — A. Bruce Clay

(57) ABSTRACT

A Java object is scan-missed during the mark phase of a garbage collection cycle. A list of any unscanned objects, comprising all objects of a particular object type, is created during a sweep phase of the garbage collection cycle. After the garbage collection cycle is completed, and the application resumes, for every PUTFIELD/GETFIELD operation on the object type that is part of a specific parent object, a comparison is made with the relevant information in the unscanned objects list. A scan-miss is identified by determining whether the current object being referenced by the application is a part of the unscanned object list that has been created during the sweep phase of the garbage collection cycle.

15 Claims, 3 Drawing Sheets

DETERMINING WHETHER A JAVA OBJECT HAS BEEN SCAN-MISSED BY A GARBAGE COLLECTOR SCAN

BACKGROUND

The present invention relates in general to Java Object corruption issues, and more specifically, to determining the occurrence of a garbage collection (GC) 'scan-miss' for a Java object.

Java Object corruption issues are difficult to diagnose and even more difficult to fix. Information that is initially made available (as First Failure Data Capture to the analyzer is minimal, and, usually, multiple iterations of tracing and contextual diagnosis is necessary to identify the root cause and eventually fix it). A Java Object corruption issue typically manifests itself when a certain piece of memory on the Java Heap is expected to hold an object of a certain type, but at the point of access, or profile, ends up pointing to:

1. Garbage (freed memory); or
2. A different object than the one expected; or
3. The middle of an object, as opposed to the beginning of the object.

The reasons for these types of corruption issues are multifold with the causal factor being anywhere in the Just in Time Compiler (JIT) component of the JAVA Virtual Machine (JVM) (JAVA and JVM are a trademarks of Oracle Corp.), thread suspension mechanism in the JVM, operating system efficacy (for example, weak consistency on AIX) (AIX is a trademark of IBM Corp.) or issues in the Garbage Collection itself. With the exception of a bug in the Garbage Collector software, object corruption issues fundamentally boil down to a certain object not being scanned under a certain context by the garbage collector. For example, it could be because of the JIT (as a part of an optimization) placing an object in an area that is traditionally not scanned (e.g., on floating point registers which are not scanned in certain implementations of Virtual Machines), or the object being a part of a thread stack range that is not scanned by the garbage collector.

Therefore, the first step toward diagnosing an object corruption issue is to ascertain whether the invalid reference (or the corrupt object reference) was, indeed, not scanned and retrieve the context under which the object was not scanned, i.e., the scan-miss context. Typically the scan-miss context would encapsulate the following information:

1. After which garbage collection cycle was the invalid object accessed (or the last complete GC cycle before the failure);
2. During which garbage collection cycle was the object not scanned (should normally be the same as above, but not necessarily);
3. At the point of not being scanned/marked where was the object residing:
   a. Directly on a thread stack? Corresponding Stack Slot?
   b. On a register? Which one?
   c. Somewhere else? (Ideally, there is no other place, this would indicate that the object reference was not in any place available for scanning)

BRIEF SUMMARY

According to one embodiment of the present invention, a method detects a scan-miss of a Java object during a mark phase of a garbage collection cycle. The Java object is related to an application in use. An unscanned object list is created with a processor during a sweep phase of the garbage collection cycle. The unscanned object list comprises all objects of a particular object type that were not marked in the mark phase of the garbage collection cycle. After the garbage collection cycle is completed and the application resumes, the unscanned object list is iterated through for every PUTFIELD/GETFIELD operation on the particular object type and the parent of the particular object type. A scan-miss is identified by determining whether the current object type being referenced is a part of the unscanned object list.

According to one embodiment of the present invention, a system detects a scan-miss of a Java object during a mark phase of a garbage collection cycle. The Java object is related to an application in use. A memory, connected to a processor, is encoded with instructions. When executed the instructions comprise instructions for creating an unscanned object list during a sweep phase of the garbage collection cycle. The unscanned object list comprises all objects of a particular object type that were not marked in the mark phase of the garbage collection cycle. After the garbage collection cycle is completed and the application resumes, for every PUTFIELD/GETFIELD operation on the particular object type and a parent of the particular object type, the unscanned object list is searched. A scan-miss is determined if a current object type being referenced is a part of the unscanned object list.

According to one embodiment of the present invention, a computer program product detects a scan-miss of a Java object during a mark phase of a garbage collection cycle, the Java object being related to an application in use. The computer program product comprises a computer readable storage medium having computer readable program code embodied therewith. Computer readable program code is configured to create an unscanned object list, during a sweep phase of the garbage collection cycle. The list comprises all objects of a particular object type that were not marked in the mark phase of the garbage collection cycle. After the garbage collection cycle is completed and the application resumes, for every PUTFIELD/GETFIELD operation on the particular object type and a parent of said particular object type, computer readable program code is configured to iterate through the unscanned object list. Computer readable program code is configured to identify a scan-miss by determining whether a current object type being referenced is a part of the unscanned object list.

DETAILED DESCRIPTION

Figure 1:
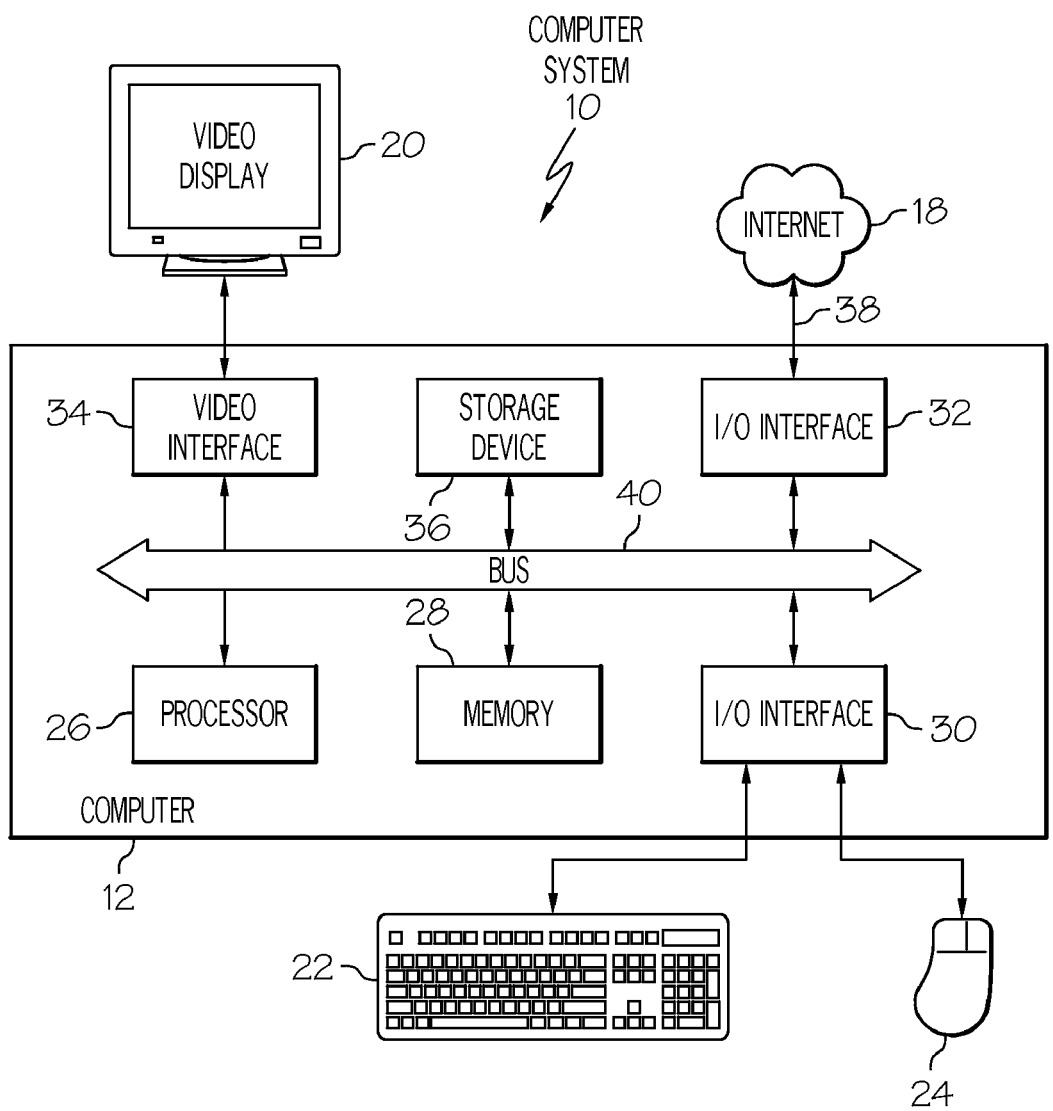
FIG. 1 is an illustration of a computer system upon which the present invention might operate.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is one example of a computer system 10 suitable for executing computer software for determining if an object has been scan-missed by a garbage collector. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers (not shown) may be connected to the computer 12 via a network, such as the Internet 18, may comprise the same physical arrangement as the computer 12, or may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

In order to manage the limited resource of computer memory, computer systems typically have some type of garbage collection cycle which automatically searches memory for objects that are no longer in use by an application. A Garbage Collection process, in general, involves the following three phases:

1. Mark;
2. Sweep; and
3. Compaction (Optional).

In the Mark phase, all reachable live objects are determined. This is done by scanning the heap, thread stacks, registers, JNI global references, etc., for possible references to objects. When found, the references are marked (a mark bit is set to one) to indicate the objects are live. In the Sweep phase, the garbage collector scans through the heap and reclaims all the unmarked objects. The garbage collector then moves all the live objects to coalesce the free space in the Compaction phase. The Compaction phase is optional and happens only if certain criteria are met.

During the Mark phase, the stack slots are scanned and the live objects are ear marked. Conversely, the objects that are not scanned would be lined up for collection. It is in this phase that scan-misses are likely to occur. The garbage collector is designed to look at 'standard places for live objects. Typically, accurate collectors have, to a large extent, eliminated the chances of stale references, but they would not be in a position to prevent scan-misses because of JIT optimizations or bugs within the garbage collector. As previously indicated above, scan-misses result in collection of 'actually' live objects, resulting in an application failing the next time it tries to access the wrongly collected object.

According to an embodiment of the present invention, a Java object has been "scan-missed" during the mark phase of a garbage collection process. During the sweep phase, an Unscanned List of objects of a particular object type (Object Type) specified by the end user (or any other predetermined process) through a command line parameter, for example, an Object Type can be a StringBuffer Object Type, that were not marked in the corresponding garbage collection cycle is created. At this stage the Unscanned List contains scan-miss candidates. When the application resumes after the garbage collection cycle is completed, each time an object of the specified type (in general, Object Type or in particular, the above example of StringBuffer) is accessed through an XFIELD bytecode operation (XFIELD could be any of a PUTFIELD and any of a GETFIELD (hereinafter PUTFIELD/GETFIELD) bytecode), the address of the object accessed is compared with the information in the Unscanned List. If a match is found, relevant diagnostics are triggered. To extend the example of StringBuffer, once the Unscanned List of StringBuffer objects is built in the GC cycle, every XFIELD operation on a StringBuffer type object is tracked and compared with the information in the Unscanned List. If XFIELD is operating on any of the addresses in the Unscanned List, then the address is deemed to be a 'scan-miss' and the diagnostic information is generated.

In an embodiment of the present invention, a mechanism determines if a live object was 'not scanned.' The mechanism involves the following steps:

1. Inform the JVM (i.e., provide the information on the object that needs to be tracked);
2. Create/Update the Unscanned list; and
3. Determine scan-miss during execution.

Figure 2:
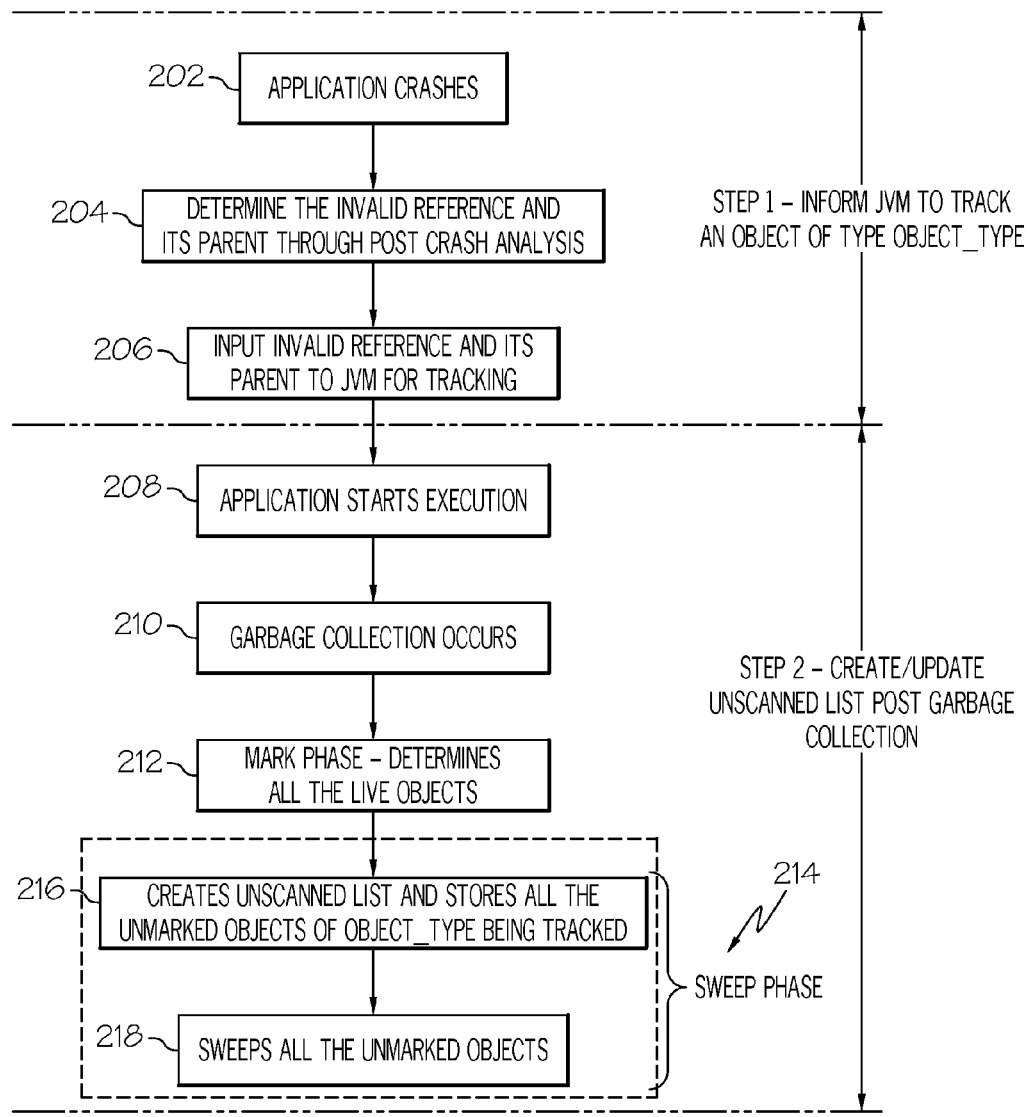
FIG. 2 is a flowchart representing the first two steps of one embodiment of the present invention.
Figure 3:
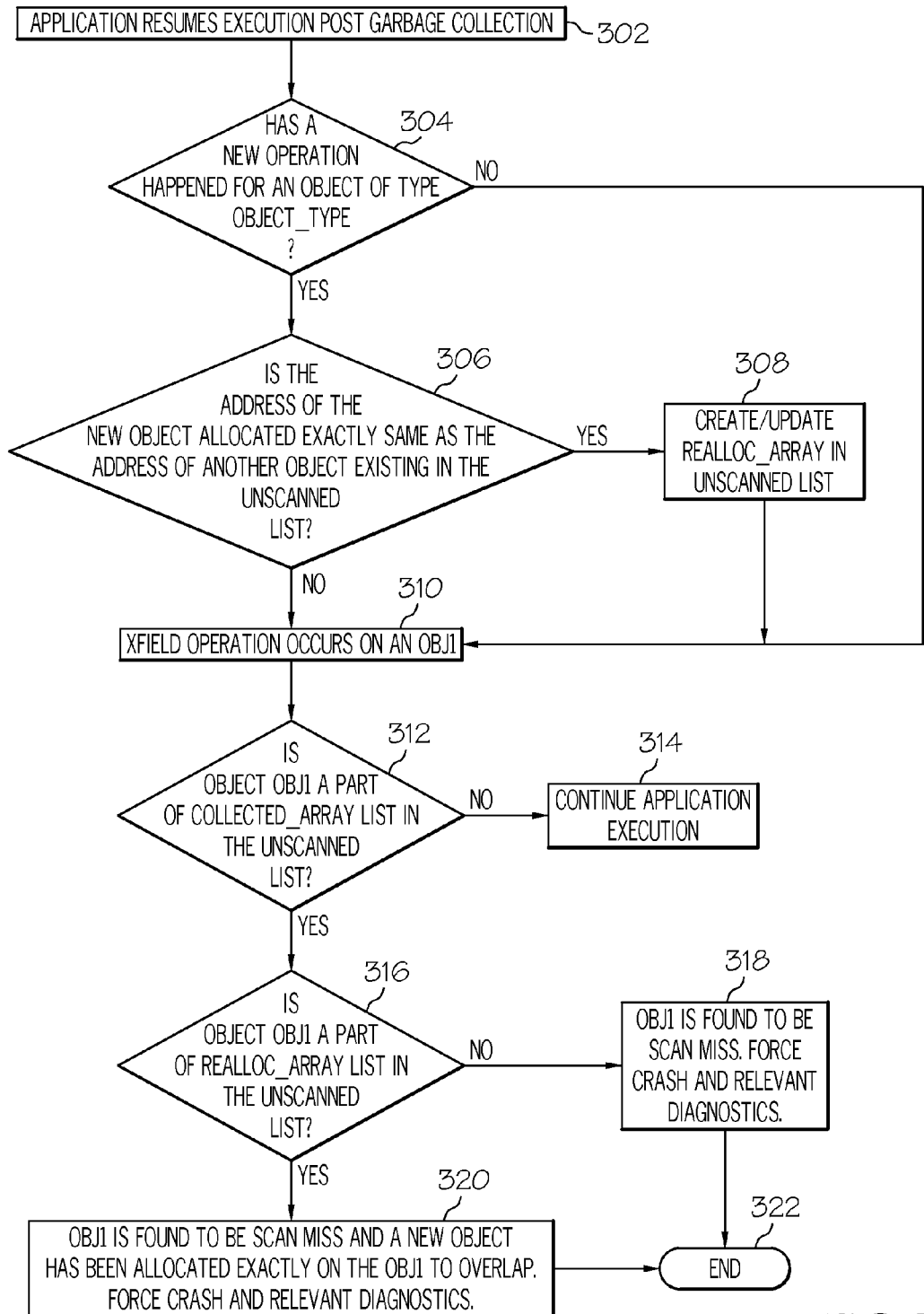
FIG. 3 is a flowchart representing the third step of one embodiment of the present invention.

With reference now to FIGS. 2 and 3, an embodiment of the present invention is described.

First Step: Informing the JVM.

Referring first to FIG. 2, at block 202, the application crashes for the first time due to object corruption (i.e., a needed object has been removed during a garbage collection cycle). At block 204, the crash dumps are analyzed, and the object type that has been corrupted will be determined, i.e., the invalid inference. The 'parent' of the invalid reference is also determined. At block 206, the invalid reference and its parent can, therefore, be provided as an input parameter to the JVM to minimize the level of tracking that needs to be done. This can be done through a command line parameter. A format for the command line could be as follows:

java -Xtrack=invalid_reference:parent

For example, upon post crash analysis of a core file, it is determined that the invalid reference is, for example, a StringBuffer object, and its parent is a Thread object (every Thread object has a StringBuffer field in which the name of the thread is stored). The command line parameter would read as follows:

java -Xtrack=java/lang/StringBuffer;java/lang/Thread

Second Step: Create/Update the Unscanned List Post Garbage Collection.

At block 208, the application starts execution. The Garbage Collection occurs at block 210. At block 212, the Mark Phase of the Garbage Collection determines all the live objects. The Garbage Collection Sweep phase, as generally indicated by reference numeral 214, starts. Continuing with the same example above, where the invalid reference has been determined to be a StringBuffer and it's parent a Thread object, a list of all StringBuffer objects that were not marked in the corresponding garbage collection cycle is built and stored at block 216. This is called the Unscanned List (of objects). At block 218, all the unmarked objects are swept.

The object address is the only necessary information that needs to be maintained as annotated with the garbage collection cycle number. Continuing with the same example above, where the invalid reference has been determined to be a StringBuffer and it's parent a Thread object, the following information on the unmarked StringBuffer objects could be captured and encapsulated within a data structure such as:

```
struct Unscanned_List
{
gc no.
collected_array, // address of StringBuffer objects that were collected in garbage
collection cycle no.
realloc_array: // address of StringBuffer objects that were reallocated exactly on the
collected StringBuffer object addresses
next; // create a list which can be maintained for 'n' garbage collection cycles
}
Where a collected_array, in general, contains the address of the potential scan-miss
candidates of the specified object type and is generated during the sweep phase. The
realloc_array is created during application execution when it has been determined that a
newly allocated object overlaps exactly with an address corresponding to one of the
entries already in the collected_array. The realloc_array is maintained specifically for
detecting the occurrence of an exact overlap.
```

It should be noted that the collected_array and the realloc_array are only suggested implementation specifics, and they intend to convey that two separate pieces of information need to be captured:
1. A list of unscanned objects (scan-miss candidates) of a certain object type created during the sweep phase, and
2. A list of newly created objects that have been exactly overlaid on one of the unscanned objects in the above list.

The implementation through an array is one way of implementation, but any other plausible data structure can be used.

The Unscanned List can be maintained for 'n' number of garbage collection cycles where the number 'n' can be tuned according to the context of the problem being solved. In effect, at the end of the exercise, the following information would be stored: the addresses of StringBuffer objects that have been collected in the current garbage collection cycle. It should be noted that the Unscanned List is a broad list that would predominantly contain instances of the object type that were validly not scanned as well as scan-miss candidates.

Third Step: Determine a Scan-Miss During Execution.

Continuing with the example above in which the invalid reference has been determined to be a StringBuffer and its parent a Thread object, the third step is described with reference to FIG. 3. At block 302, the application resumes after the garbage collection cycle is completed. It is then determined at decision block 304 whether a new operation has occurred on a particular object of the type Object_Type (i.e., StringBuffer) that is stored in the Unscanned List. If the response to decision block 304 is no, the process flows to block 310.

If it is determined at decision block 304 that a new operation has occurred on a object of the type Object_Type (i.e., StringBuffer) that is stored in the Unscanned List, the process flows to decision block 306. At decision block 306, it is determined whether the allocated address of the new object is exactly the same as the address of another object already existing in the collected_array of the Unscanned List. If the response to decision block 306 is yes, the process flows to block 308 where the realloc_array in the Unscanned List is updated with an entry for this object. If the response to decision block 306 is no or after block 308, the process flows to block 310 where an XFIELD operation (X can carry the values of PUT/GET) occurs on a first object labeled as Obj1. For every XFIELD operation on Obj1, that is a part of a specified parent object, Obj2, the collected_array in the Unscanned List nodes are iterated through at decision block 312. If it is determined at decision block 312 that the current reference, for example, Obj1, is not in the collected_array in the Unscanned List (i.e., the response is no), the application continues to execute at block 314.

If it is determined at decision block 312 that the currently referenced object (here, Obj1) is part of the collected_array of the Unscanned List, the process flows to decision block 316. It is determined at decision block 316 whether the Obj1 is part of the realloc_array in the Unscanned List. If the response to decision block 316 is no, the flow proceeds to block 318. In block 318, Obj1 is found to be a scan-miss (i.e., it should not have been collected for removal), and a crash is forced so that relevant diagnostics (print information about the scan-miss object, generate core dump, etc) are initiated to determine why the object was erroneously collected. The diagnostics would contain information on the Garbage Collection cycle in which the original StringBuffer object was collected. A match thus found only in the collected_array list corresponds to the scan-miss candidate StringBuffer, and this represents a 'normal case' (wherein the overlap is not exact).

If the response to decision block 316 is yes (Obj1 is in both the collected_array and the realloc_array), the process flows to block 320 where it is found to be a scan-miss. The new object that was allocated exactly overlaps the address of Obj1, and a crash is forced and the relevant diagnostics are run. A match found in both the realloc_array and the collected_array represents an extraneous (or special) case of an 'exact overlap.' Information about the newly created (by application execution) StringBuffer object that has exactly overlapped on a former Unscanned List object is included as part of the diagnostics.

The exact overlap is a special case, because the new object that was allocated is of the same object type (for ex: StringBuffer) and is allocated at the same address as that of an object already being tracked as a scan-miss candidate. For example, an object of type Obj1 is being tracked. An object O1 of type Obj1 at address 0x12345 has been added to the collected_array in the sweep phase. When an XField operation occurs on any object of type Obj1, the contents of the collected_array are checked. Thus, when an XField operation happens on an object of type Obj1 at the same address 0x12345, the search within the collected_array will produce a hit and the diagnostics will be generated. An end-user analyzing the diagnostics will see at address 0x12345 an expected object of type Obj1. Without a realloc_array check/creation, under this circumstance, it would be impossible for the analyzer to know that a "new" object of type Obj1 has been overlaid on an old object of type Obj1. Therefore, the special case of "exact overlap" tracks new allocations of type Obj1. If they are allocated in the same address as an entry already in the collected_array, make a copy in a different area of memory, i.e., the realloc_array. If there is an entry matching both the collected_array and realloc_array, standard diagnostics will be backed up by the specific information that there has been a new allocation of the same object type that has been perfectly overlaid.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for detecting a scan-miss of a Java object during a mark phase of a garbage collection cycle, the Java object being related to an application in use, comprising: creating, with a processor, an unscanned object list of scan-miss candidates during a sweep phase of the garbage collection cycle, said unscanned object list comprising objects of a particular object type that were not marked in the mark phase of the garbage collection cycle; after the garbage collection cycle is completed and the application resumes, for every PUTFIELD/GETFIELD each PUTFIELD and each GETFIELD operation on said particular object type and a parent of said particular object type, iterating through said unscanned object list; and identifying a scan-miss object by determining whether a current object, that is of said particular object type being referenced by the application, is on said unscanned object list; and initiating a system crash and relevant diagnostics to detect object corruption upon identifying said scan-miss object.

2. The method of claim 1, wherein said unscanned object list stores any said unmarked objects of a particular object type in a data structure referred to as a collected array.

3. The method of claim 2, wherein said unscanned object list further stores in another data structure, referred to as a reallocated array, any newly created object that has an address matching an entry in said collected array when the application resumes.

4. The method of claim 3, further comprising checking said reallocated array information in the unscanned list to determine a special case of an exact overlap of a scan-miss object by another object of a same type.

5. The method of claim 1, wherein said objects of a particular object type are pre-specified.

6. A system for detecting a scan-miss of a Java object during a mark phase of a garbage collection cycle, the Java object being related to an application in use, comprising: a processor; and memory connected to said processor, wherein said memory is encoded with instructions and wherein the instructions when executed comprise: instructions for creating an unscanned object list of scan-miss candidates during a sweep phase of the garbage collection cycle, said unscanned object list comprising objects of a particular object type that were not marked in the mark phase of the garbage collection cycle;

after the garbage collection cycle is completed and the application resumes, for each PUTFIELD and each GETFIELD operation on said particular object type and a parent of said particular object type, instructions for iterating through said unscanned object list;

instructions for identifying a scan-miss object by determining whether a current object, that is of said particular object type being referenced, is on said unscanned object list; and instructions for initiating a system crash and any appropriate diagnostics upon identifying said scan-miss object.

7. The system of claim 6, further comprising instructions for said unscanned object list to store any said unmarked objects of particular object type in a data structure referred to as a collected array.

8. The system of claim 7, further comprising instructions for said unscanned object list to store in another data structure, referred to as a reallocated array, any newly created object that has an address matching an entry in said collected array when the application resumes.

9. The system of claim 8, further comprising instructions for checking said reallocated array information in the unscanned list to determine a special case of an exact overlap of a scan-miss object by another object of a same type.

10. The system of claim 6, wherein said objects of a particular object type are pre-specified.

11. A computer program product for detecting a scan-miss of a Java object during a mark phase of a garbage collection cycle, the Java object being related to an application in use, the computer program product comprising a computer readable storage device having computer readable program code embodied therewith, the computer readable program code comprising:

computer readable program code configured to create an unscanned object list of scan-miss candidates during a sweep phase of the garbage collection cycle, said list comprising objects of a particular object type that were not marked in the mark phase of the garbage collection cycle; after the garbage collection cycle is completed and the application resumes, for each PUTFIELD and each GETFIELD operation on said particular object type and a parent of said particular object type, computer readable program code configured to iterate through said unscanned object list;

computer readable program code configured to identify a scan-miss object by determining whether a current object, that is of said particular object type being referenced, is on said unscanned object list; and computer readable program code configured to initiate a system crash and relevant diagnostics to detect object corruption upon identifying said scan-miss object.

12. The computer program product of claim 11, further comprising computer readable program code configured to store any said unmarked object type in a data structure referred to as a collected array.

13. The computer program product of claim 12, further comprising computer readable program code configured to store in another data structure, referred to as a reallocated array, any newly created object that has an address matching an entry in said collected array when the application resumes.

14. The computer program product of claim 13, further comprising computer readable program code configured to check said reallocated array information on the unscanned list to determine a special case of an exact overlap of a scan-miss object by another object of a same type.

15. The computer program product of claim 11, further comprising computer readable program code configured to allow said objects of a particular object type to be pre-specified.

* * * * *